(12) United States Patent
Desai et al.

(10) Patent No.: US 8,561,076 B1
(45) Date of Patent: Oct. 15, 2013

(54) PRIORITIZATION AND QUEUING OF MEDIA REQUESTS

(75) Inventors: Ravindranath S. Desai, Mountain View, CA (US); Grant Woodside, Mountain View, CA (US); William C. Biester, Mountain View, CA (US)

(73) Assignee: EMC Corporation, Hopkinton, MA (US)

( * ) Notice: Subject to any disclaimer, the term of this patent is extended or adjusted under 35 U.S.C. 154(b) by 1187 days.

(21) Appl. No.: 10/883,624

(22) Filed: Jun. 30, 2004

(51) Int. Cl.
*G06F 9/46* (2006.01)
*G06F 15/173* (2006.01)
*G06F 15/16* (2006.01)
*G06F 13/00* (2006.01)

(52) U.S. Cl.
USPC ........... 718/104; 709/225; 709/226; 709/229; 711/151; 711/152; 711/153

(58) Field of Classification Search
USPC ................ 718/1–105; 709/207, 201–203, 709/223–229; 711/147–153
See application file for complete search history.

(56) References Cited

U.S. PATENT DOCUMENTS

| | | | |
|---|---|---|---|
| 4,161,779 A * | 7/1979 | Spencer et al. .................. 710/41 |
| 4,451,528 A | 5/1984 | Krause | |
| 4,642,756 A * | 2/1987 | Sherrod ......................... 718/103 |
| 4,937,743 A | 6/1990 | Rassman et al. | |
| 4,987,533 A | 1/1991 | Clark et al. | |
| 5,136,581 A | 8/1992 | Muehrcke | |
| 5,457,735 A * | 10/1995 | Erickson ........................ 455/450 |
| 5,544,318 A * | 8/1996 | Schmitz et al. ................ 709/207 |
| 5,566,348 A | 10/1996 | Dahman et al. | |
| 5,581,703 A | 12/1996 | Baugher et al. | |
| 5,596,502 A | 1/1997 | Koski et al. | |
| 5,664,196 A | 9/1997 | Hecker | |
| 5,768,141 A | 6/1998 | Hanaoka et al. | |
| 5,784,647 A * | 7/1998 | Sugimoto ........................ 710/39 |
| 5,905,877 A * | 5/1999 | Guthrie et al. ................ 710/112 |
| 5,983,318 A | 11/1999 | Willson et al. | |
| 5,991,822 A | 11/1999 | Mealey et al. | |
| 6,038,490 A | 3/2000 | Dimitri et al. | |
| 6,157,963 A * | 12/2000 | Courtright et al. ................ 710/5 |
| 6,219,763 B1 * | 4/2001 | Lentz et al. .................... 711/151 |
| 6,230,075 B1 | 5/2001 | Nishijo et al. | |
| 6,230,200 B1 | 5/2001 | Forecast et al. | |
| 6,249,849 B1 | 6/2001 | Day, III et al. | |
| 6,295,179 B1 | 9/2001 | Taniai et al. | |
| 6,328,766 B1 * | 12/2001 | Long ................................ 710/8 |
| 6,330,572 B1 * | 12/2001 | Sitka ............................. 707/205 |
| 6,401,223 B1 * | 6/2002 | DePenning ..................... 714/42 |
| 6,463,513 B1 | 10/2002 | Bish et al. | |

(Continued)

OTHER PUBLICATIONS

Segment of Source Code from the MediaStor™ component associated with EMC Corp.'s DiskXtender™ product.

(Continued)

*Primary Examiner* — Abdullah Al Kawsar
(74) *Attorney, Agent, or Firm* — Van Pelt, Yi & James LLP

(57) ABSTRACT

Coordinating media requests from a plurality of sources that share a shared media resource is disclosed. One or more media requests requiring action by the shared media resource is received from one or more of the plurality of sources. Each received media request is placed in a queue of requests requiring action by the shared media resource. Media requests in the queue are serviced based at least in part on their relative importance.

26 Claims, 11 Drawing Sheets

(56) References Cited

U.S. PATENT DOCUMENTS

| | | | |
|---|---|---|---|
| 6,467,024 B1 | 10/2002 | Bish et al. | |
| 6,507,883 B1 | 1/2003 | Bello et al. | |
| 6,557,039 B1 * | 4/2003 | Leong et al. | 709/229 |
| 6,671,749 B2 | 12/2003 | Williams et al. | |
| 6,697,924 B2 | 2/2004 | Swank | |
| 6,775,716 B2 * | 8/2004 | Tojima et al. | 710/22 |
| 6,779,058 B2 | 8/2004 | Kishi et al. | |
| 6,807,550 B1 * | 10/2004 | Li et al. | 707/201 |
| 6,851,031 B2 | 2/2005 | Trimmer et al. | |
| 6,877,072 B1 | 4/2005 | Dias et al. | |
| 6,880,028 B2 * | 4/2005 | Kurth | 710/240 |
| 6,895,585 B2 * | 5/2005 | Smith | 718/103 |
| 6,895,591 B1 | 5/2005 | Russ et al. | |
| 6,924,954 B2 | 8/2005 | Suzuki | |
| 6,985,916 B2 | 1/2006 | Carlson et al. | |
| 7,000,048 B2 | 2/2006 | McAlpine et al. | |
| 7,016,418 B2 * | 3/2006 | Wang et al. | 375/240.24 |
| 7,047,292 B1 * | 5/2006 | Stewart et al. | 709/224 |
| 7,055,151 B1 | 5/2006 | Joffe et al. | |
| 7,107,417 B2 | 9/2006 | Gibble et al. | |
| 7,131,025 B2 * | 10/2006 | Tarcea et al. | 714/6 |
| 7,171,667 B2 * | 1/2007 | Libby | 718/104 |
| 7,200,722 B2 | 4/2007 | Goodman et al. | |
| 7,231,445 B1 * | 6/2007 | Aweya et al. | 709/226 |
| 7,533,181 B2 * | 5/2009 | Dawson et al. | 709/229 |
| 7,810,096 B2 * | 10/2010 | Saito et al. | 718/103 |
| 2002/0002606 A1 | 1/2002 | Jaffe | |
| 2002/0019863 A1 | 2/2002 | Reuter | |
| 2002/0083117 A1 * | 6/2002 | Goddard | 709/103 |
| 2003/0009604 A1 | 1/2003 | Howard et al. | |
| 2003/0074599 A1 | 4/2003 | Golasky et al. | |
| 2003/0174648 A1 * | 9/2003 | Wang et al. | 370/235 |
| 2003/0233510 A1 * | 12/2003 | Umbehocker et al. | 711/100 |
| 2004/0019670 A1 * | 1/2004 | Viswanath | 709/223 |
| 2004/0044863 A1 | 3/2004 | Trimmer et al. | |
| 2004/0221101 A1 * | 11/2004 | Voorhees et al. | 711/111 |

OTHER PUBLICATIONS

SGI Open Vault specification downloaded from http://sgi.com/products/software/openvault/techspecs.html.

Media Management System Requirements, Working Draft 5.2; IEEE Storage System Standards Working Group; Jan. 30, 1998.

Mass Storage System Reference Model V5 (MSSRM) from http://www.ssswg.org/public_documents/MSSRM/V5.html.

D. T. Feriozi "A Split Model for OS/2 SCSI Device Drivers" IBM Systems Journal, IBM Corp. Armonk, New York, US, vol. 31, No. 1, Jan. 1992 pp. 114-122, XP000261870 ISSN: 0018-8670.

* cited by examiner

PRIORITIZATION AND QUEUING OF MEDIA REQUESTS

CROSS REFERENCE TO RELATED APPLICATIONS

This application is related to U.S. patent application Ser. No. 10/882,651, now issued U.S. Pat. No. 7,308,529, entitled EFFICIENT MOUNTING AND DISMOUNTING OF STORAGE MEDIA filed concurrently herewith, which is incorporated herein by reference for all purposes; and U.S. patent application Ser. No. 10/883,563, now abandoned, entitled COORDINATED MOUNTING OF MULTIPLE STORAGE MEDIA VOLUMES filed concurrently herewith, which is incorporated herein by reference for all purposes; and U.S. patent application Ser. No. 10/883,017, now issued U.S. Pat. No. 7,076,327, entitled SIMULTANEOUS PROCESSING OF MEDIA REQUESTS filed concurrently herewith, which is incorporated herein by reference for all purposes.

This application is related to pending U.S. patent application Ser. No. 10/737,715 entitled AUTOMATED MEDIA MANAGEMENT filed Dec. 16, 2003, which is incorporated herein by reference for all purposes.

FIELD OF THE INVENTION

The present invention relates generally to removable storage media. More specifically, prioritization and queuing of media requests is disclosed.

BACKGROUND OF THE INVENTION

Fully or partially automated media libraries, sometimes referred to herein as "libraries" or "robots", are available to store and manipulate removable storage media, such as tapes used to store computer data for backup or archive purposes. A typical library may be equipped with a robotic or other mechanism for manipulating the media stored therein, such as by inserting a selected volume or unit of the media (e.g., a particular tape) into a read/write device associated with the unit, e.g., a tape drive configured to write data to and/or read data from the media. In the computer network environment, e.g., a backup application (sometimes referred to herein as "data mover") may be used to store data from one or more computers or other devices connected to the network (sometimes referred to herein as network "nodes" or "hosts") on storage media associated with a library.

For a large network, or in cases in which nodes on the network use a variety of different applications and/or hardware platforms, or where the nature of the data is diverse, or simply as a result of separate purchasing decisions being made over time and/or by separate subsets of the group of users served by the network, it is possible to have two or more different backup applications in place. For similar reasons, a particular network may have associated with it more than one library, possibly of different types, and a plurality of storage devices associated with each library. In addition, the hosts associated with the various storage devices may be connected to those devices in different ways, and the hosts themselves may be of different platform types (e.g., different operating systems).

Given this potential diversity of storage media resources and backup applications, there is a possibility that multiple competing requests will be made for a common resource, such as a resource associated with a library. There is therefore a need for a straightforward and efficient way to coordinate multiple media requests.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Coordination of media requests is disclosed. Media requests are received and placed in queue. In one embodiment, each media request is placed in the queue based on a priority associated with the request. Requests in the queue are serviced.

Figure 1A:
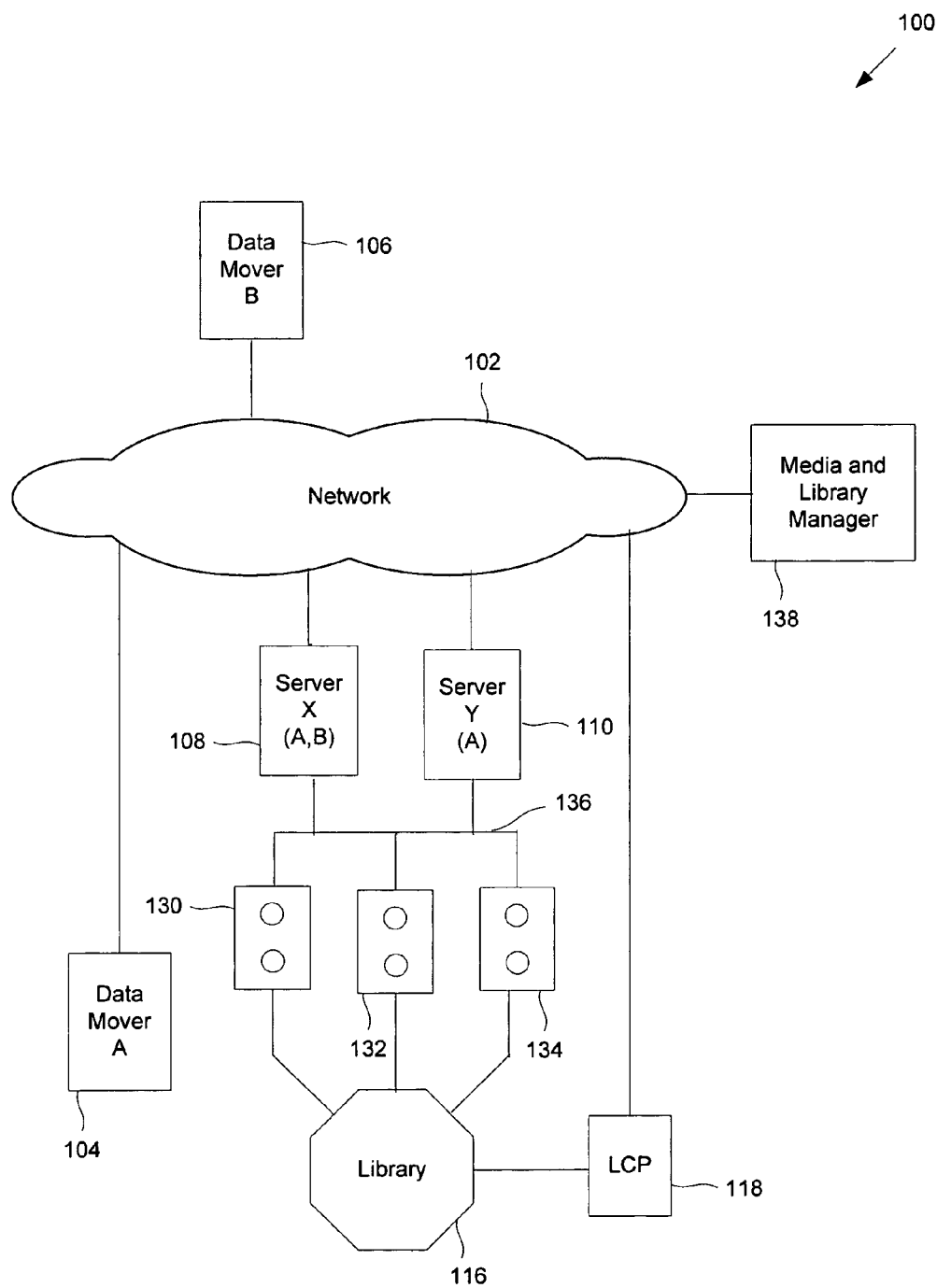
FIG. 1A is a block diagram illustrating one exemplary embodiment of a network environment and a media management system.

FIG. 1A is a block diagram illustrating one exemplary embodiment of a network environment and a media management system. The system 100 comprises a network 102, which may be a local area network (LAN) or any type of private or public network. The system 100 further comprises servers A, B, X, and Y, identified by reference numerals 104, 106, 108, and 110, respectively, in FIG. 1A, connected to network 102. In the example shown in FIG. 1A, a first backup application, such as the NetWorker™ backup application available commercially from the Legato Software Division of EMC Corporation, is installed on server A (104), and a second backup application is installed on server B (106). The first and second backup applications may be the same or different products. In one embodiment, the backup application is a distributed application, and a portion of the backup application (i.e., a data mover agent) is installed on server A (104). The data on server X (108) is backed up by both the first backup application installed on server A (104) and the second backup application installed on server B (106), as is indicated in FIG. 1A by the letters "A" and "B" in parentheses below the letter "X". Such a configuration may be used, e.g., to provide two independent backups for particularly critical data, or where separate data mover programs are each responsible for backing up a separate set of data on the same server. Server Y (110) is backed up by the first backup application installed on server A (104). Server A may likewise comprise a body of data that is backed up by operation of the first backup application installed on server A, and server B may comprise a body of data that is backed up by operation of the second backup application installed on server B. The storage media used by the first and second backup applications installed on servers A and B, respectively, reside in storage media library 116. Storage media library 116 may be of any type. For example, storage media library 116 may be a SCSI library configured to be controlled directly by a library host 118 via a small computer systems interface (SCSI) connection. Storage media library 116 may instead be an ACSLS library, which is an automated cartridge system library software-controlled library of the type available commercially from StorageTechnology Corporation (StorageTek) of Louisville, Colo. An ACSLS-type library is controlled using a software controller provided for that purpose, as opposed to being controlled directly by the library host. Library host 118 is connected to and configured to control library 116. Library host 118 also is connected to network 102. While examples of a SCSI and ACSLS type library are described, any number or combination of types of libraries may be used, including without limitation IBM 3494, ADIC AML, and/or any other type of library. Library 116 has associated with and connected to it tape drives 130, 132, and 134. Tape drives 130, 132, and 134 are connected to servers X (108) and Y (110) via a storage area network (SAN) 136. SAN 136 makes it possible for each of servers X and Y to read from or write to any one of the SAN-connected tape drives 130, 132, and 134.

A media and library manager (MLM) 138 coordinates operations between the first backup application running on server A and the second backup application running on server B, such as by receiving and arbitrating between potentially competing requests for resources associated with library 116, as well as executing such requests. For example, the MLM may receive requests from the backup applications that a particular tape residing in the library be inserted into a tape drive. The MLM may provide other functionality, such as keeping track of tapes stored in the library and elsewhere. MLM 138 has a connection to the network 102, which it uses to communicate with other nodes connected to network 102 as described more fully below. MLM 138 may comprise a server connected to network 102.

As described in U.S. patent application Ser. No. 10/737, 715, US Patent Publication No. 2004/0221101, now abandoned, which is incorporated by reference above, in some embodiments, a library control program (LCP) is installed on library host 118. An LCP is a software agent configured to control a library to be managed by an MLM. The LCP could reside on any host that has a controller connection (e.g., SCSI) the library. Similarly, a drive control program (DCP) is installed on servers 108 and 110 in some embodiments. A DCP is a software agent configured to control a storage device (e.g., a tape drive) to be managed by an MLM. The DCP could reside on any host that has a controller connection (e.g., SCSI) to one or more storage devices. The system could include more than one LCP and more than one DCP, as needed.

Each of servers A, B, X, and Y may comprise different hardware and/or may be running a different operating system (or version thereof). In addition, the type of media stored in library 116 may vary. Also, certain elements may be connected to an associated tape device differently than others. For example, servers X and Y are connected to tape drives 130, 132, and 134 via a SAN, while servers A and B may have direct SCSI connections to other tape drives to which they are connected (not shown).

Figure 1B:
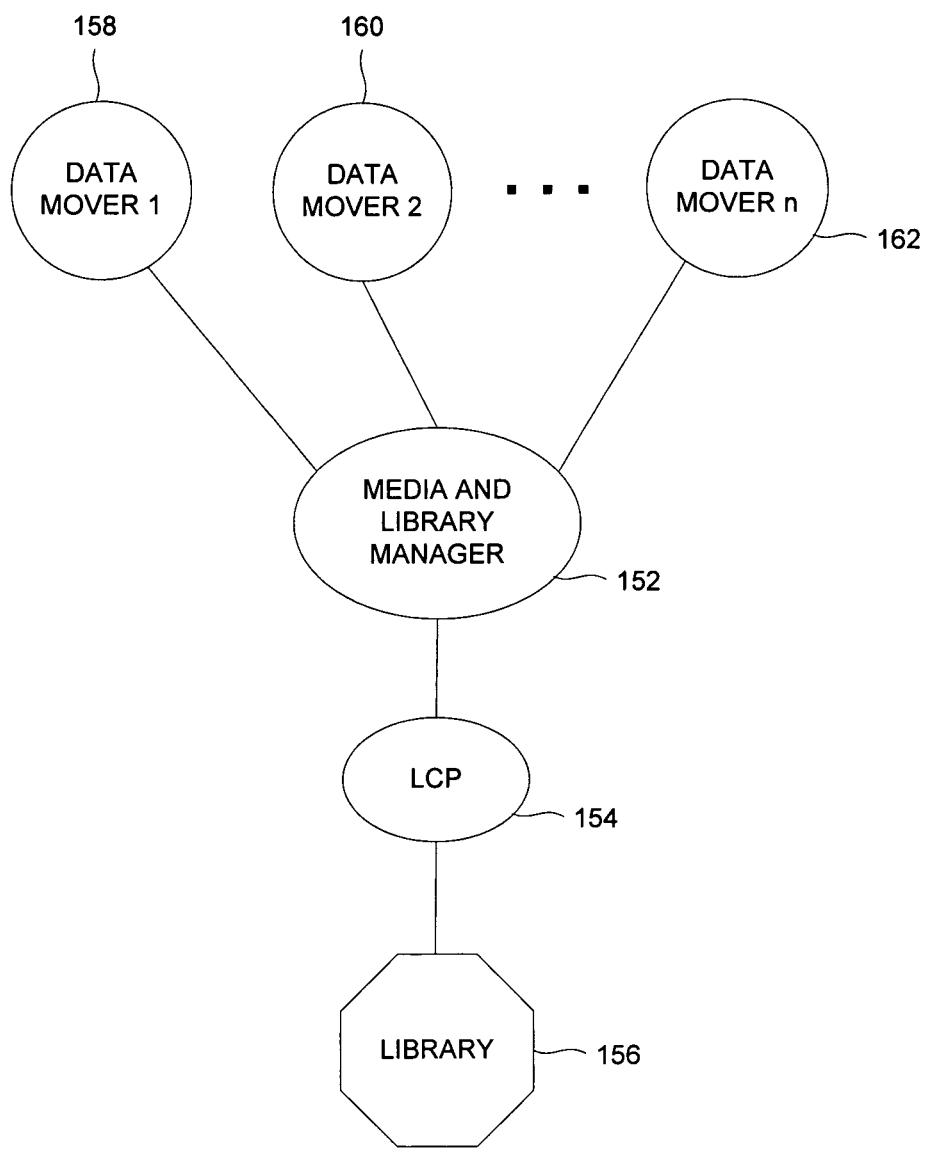
FIG. 1B is a schematic diagram showing the relationship between the media and library manager, the data movers, and the library and associated resources in one embodiment.

FIG. 1B is a schematic diagram showing the relationship between the media and library manager, the data movers, and the library and associated resources in one embodiment. In the example shown, the media and library manager 152 is configured to control the library 156 via the LCP 154. A plurality of data movers 1 to n, represented in FIG. 1B by data movers 158, 160, and 162, each has an interface to the media and library manager, which each uses to send requests for resources and/or operations by the library 156 to the media and library manager 152. The media and library manager 152 services the requests, arbitrating between conflicting requests for the same resource. Using an architecture such as the one shown in FIG. 1B simplifies the development and quality assurance process associated with developing a data mover application, e.g., by enabling the developer to create a single interface to the media and library manager, instead of having to develop a separate hardware interface for each type of library or other resource the data mover application may be required to be configured or configurable to control if the data mover were to be expected to control such libraries or other resources directly, as opposed to relying on the media and library manager to perform such functions. In the approach shown, a hardware interface would have to be developed and validated through a quality assurance process for each type of library, for example, only for the media and library manager 152, and not separately for each data mover application. The approach illustrated in FIG. 1B also facilitates the role of the media and library manager in arbitrating between conflicting or competing requests from different data movers, as described herein. For example, under the approach shown in FIG. 1B only the media and library manager 152 controls the library 156. If each data mover were able to control the library directly, each would think it "owned" the library during times when it was using the library, which could result in other data movers being locked out of use of the library, even if the other data movers had more urgent requests for resources associated with the library. Under the approach shown, the media and library manager can decide which requests from which data mover(s) will be serviced using which resources and at which time, ensuring that the most important requests are serviced first, as described more fully below.

Figure 1C:
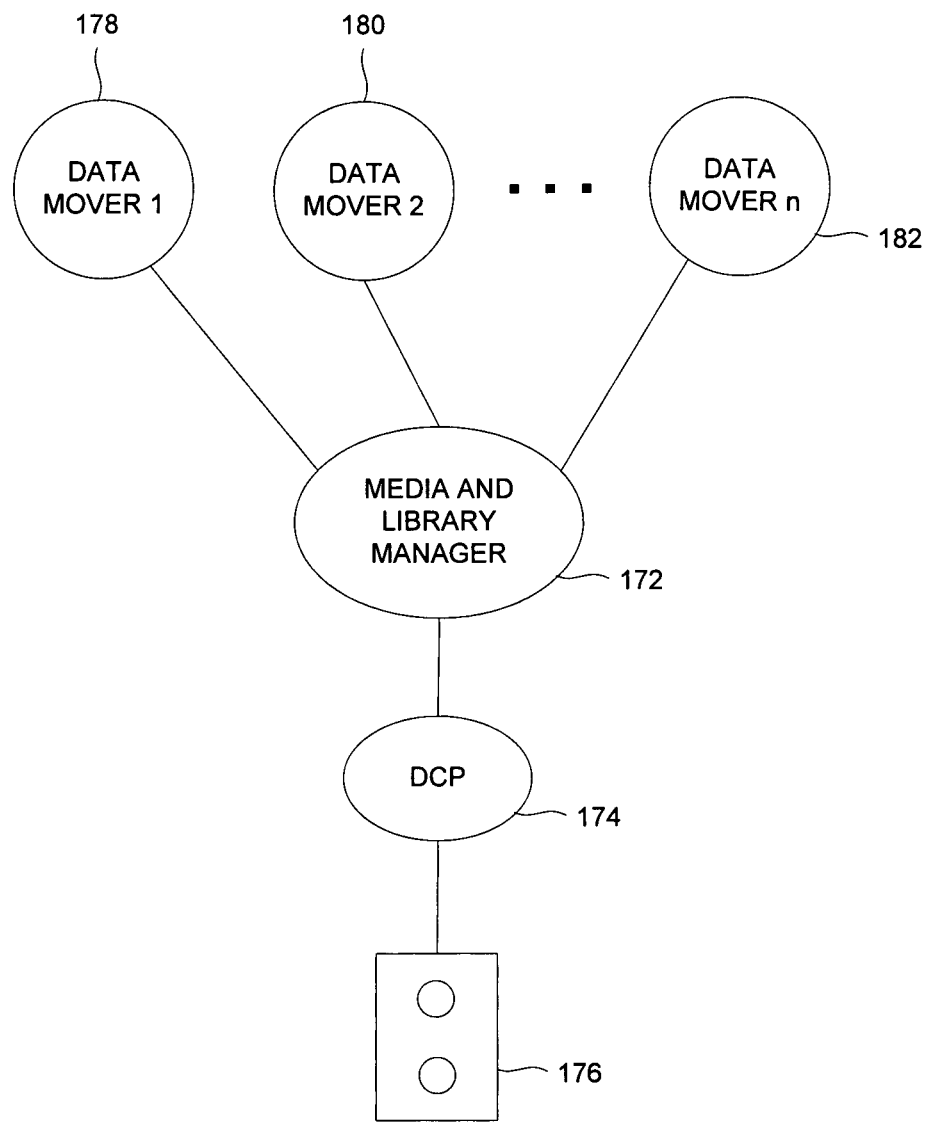
FIG. 1C is a schematic diagram showing the relationship between the media and library manager, the data movers, and a storage device and associated resources in one embodiment.

FIG. 1C is a schematic diagram showing the relationship between the media and library manager, the data movers, and a storage device and associated resources in one embodiment. In the example shown, the media and library manager 172 is configured to control the storage device 176 via the DCP 174. For example, DCP 174 may be configured to communicate with a tape drive via a SCSI connection or a SAN. A plurality of data movers 1 to n, represented in FIG. 1C by data movers 178, 180, and 182, each has an interface to the media and library manager, which each uses to send requests for resources and/or operations by the storage device 176 to the media and library manager 172. The media and library manager 172 services the requests, arbitrating between conflicting requests for the same resource. Using an architecture such as the one shown in FIG. 1C simplifies the development and quality assurance process associated with developing a data mover application, e.g., by enabling the developer to create a single interface to the media and library manager, instead of having to develop a separate hardware interface for each type of storage device or other resource the data mover application may be required to be configured or configurable to control if the data mover were to be expected to control such storage devices or other resources directly, as opposed to relying on the media and library manager to perform such functions. In the approach shown, a hardware interface would have to be developed and validated through a quality assurance process for each type of storage device, for example, only for the media and library manager 172, and not separately for each data mover application. The approach illustrated in FIG. 1C also facilitates the role of the media and library manager in arbitrating between conflicting or competing requests from different data movers, as described herein. For example, under the approach shown in FIG. 1C only the media and library manager 172 controls the storage device 176. If each data mover were able to control the storage device directly, each would think it "owned" the storage device during times when it was using the storage device, which could result in other data movers being locked out of use of the storage device, even if the other data movers had more urgent requests for resources associated with the storage device. Under the approach shown, the media and library manager can decide which requests from which data mover(s) will be serviced using which resources and at which time, ensuring that the most important requests are serviced first, as described more fully below.

Figure 2:
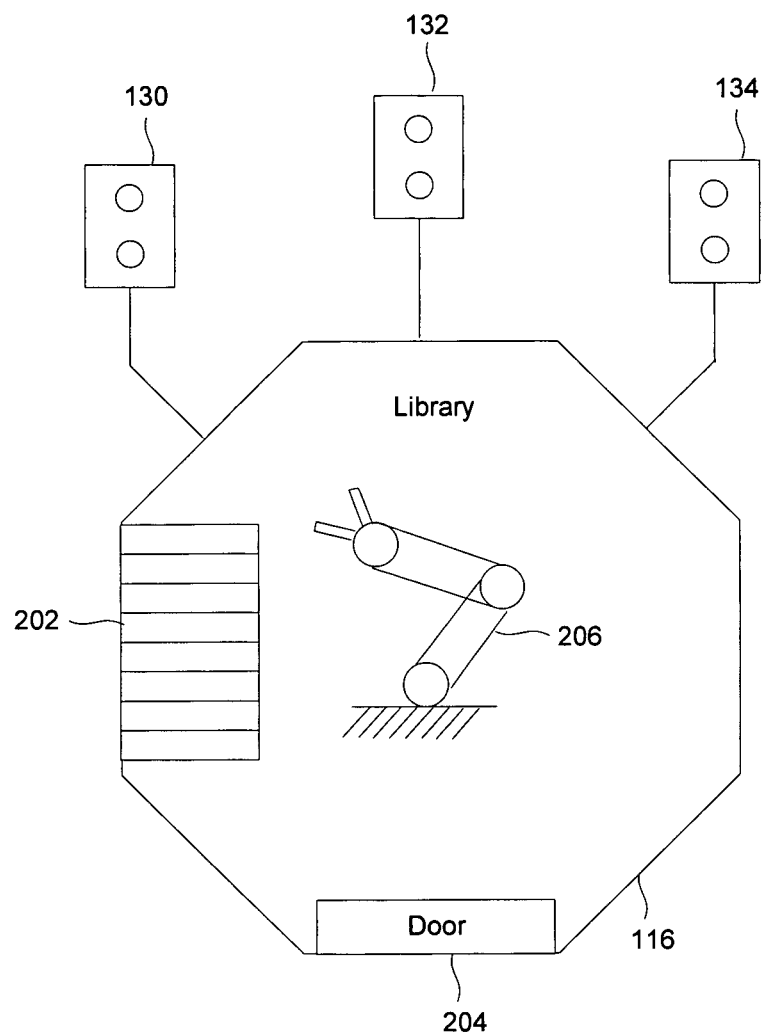
FIG. 2 is a block diagram illustrating one embodiment of a storage media library.

FIG. 2 is a block diagram illustrating one embodiment of a storage media library, such as library 116 from FIG. 1A. In this example, storage media library 116 is shown to include media slots 202, robot 206, and door 204. Other devices not shown that may be included in a library include a printer, a flipper (for multi-sided media), and removable magazines of media, which, similarly to media slots 202, have their own door and can be pulled entirely out of the library. Media slots 202 may, for example, be physical shelves on which media (e.g., tapes) are stored. A particular tape may have a home shelf where it is placed after an operation associated with the tape is completed. Robot 206 is a robotic or other mechanism for manipulating the media, such as by inserting a selected volume or unit of the media (e.g., a particular tape) into a read/write device associated with the library, e.g., a tape drive configured to write data to and/or read data from the media, such as tape drive 130, 132, or 134. Door 204, which may also be referred to as a mailbox or a cap, may be used to import (inject or add) or export (eject or remove) media to or from the library. For example, to archive a set of tapes in the library by storing them in another location, those tapes may be exported to door 204, where an operator can then open the door and remove the tapes.

Figure 3:
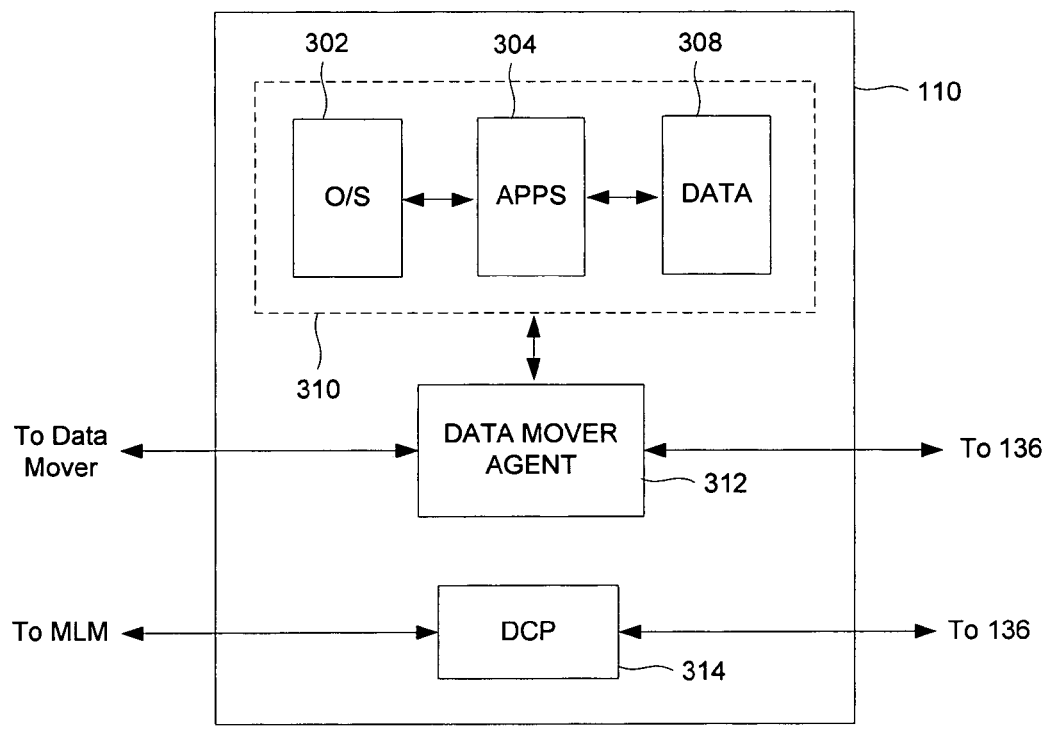
FIG. 3 is a block diagram illustrating one embodiment of a server.

FIG. 3 is a block diagram illustrating one embodiment of a server, such as server Y (110) from FIG. 1A. In this example, server 110 is shown to include an operating system 302, applications 304, and data 308, which serve the primary functionality 310 of server 110. Data mover agent 312 resides on server 110 to allow data mover A (i.e., the data mover on server A) to control a storage device (e.g., tape drive 130) associated with server 110. In some embodiments, the entire data mover resides on server 110 and data mover agent 312 is the entire data mover application. In some embodiments, server 110 includes more than one data mover agent, depending on how many data movers are configured to manipulate data on server 110. For example, in the case of server X (108) of FIG. 1A, each of data movers A and B would have an agent installed on server X, because each is configured to move data to/from server X.

DCP 314 resides on server 110 to allow a properly configured application or device, such as MLM 138, to control a storage device (such as tape drive 130) associated with server 110. For example, DCP 314 may receive and generate in response to a command from MLM 138 or data mover agent 312 a control message to control tape drive 130 as required, e.g., to cause the drive to eject a tape. In the example shown in FIG. 1A, the DCP 314 may be configured to communicate with drive 130, e.g., via SAN 136.

In some embodiments, data mover agent 312 and DCP 314 are connected to network 102 using a network interface card or other appropriate device. Thus data mover agent 312 and DCP 314 can communicate over the network with an associated data mover and the MLM, respectively.

Figure 4:
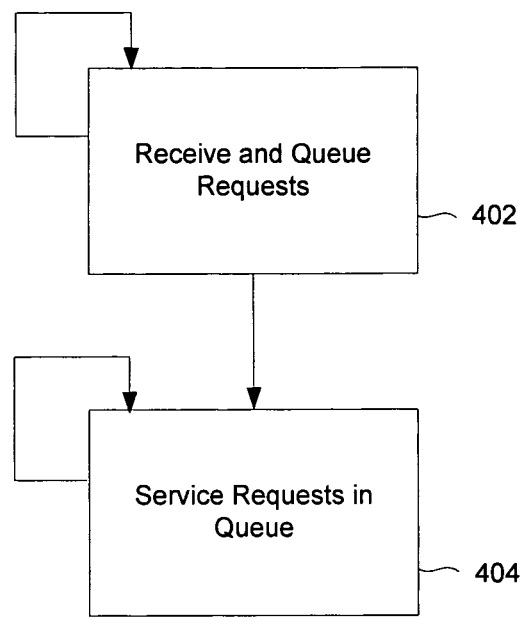
FIG. 4 is a flowchart illustrating a method used in one embodiment to coordinate media requests.

FIG. 4 is a flowchart illustrating a method used in one embodiment to coordinate media requests. The process shown in FIG. 4 may be implemented, for example, on a media and library manager such as MLM 138 of FIG. 1A. Requests are received and queued (402). Such requests may come from multiple data movers. A request may be made of a library system to perform certain operations, such as providing a list of devices associated with the library, providing the library's device identifier for each such device, providing an inventory of tapes in the library, mounting (installing) a specified tape on a designated drive, removing a tape from a drive (sometimes referred to herein as "dismounting" a tape), importing a tape to the library, exporting a tape from the library, moving a tape from one slot to another within the library, and providing an audit of tapes in the library without updating the library database. Likewise, a request may be made of a host having a connection to one or more storage devices to perform such functions with respect to devices to which it has a connection, such as providing a list of devices to which it is connected, providing a path on the host to each device (e.g., a device file), determining and reporting whether a particular device is on line, and causing a tape to be ejected from a device. Such requests may be continuously received and queued, as indicated in FIG. 4 by the arrow looping back to step 402. The process of receiving and queuing requests may be followed by or performed in parallel with a process of servicing requests in the queue (404). Requests in the queue may be continuously serviced, as indicated in FIG. 4 by the arrow looping back to step 404.

Figure 5:
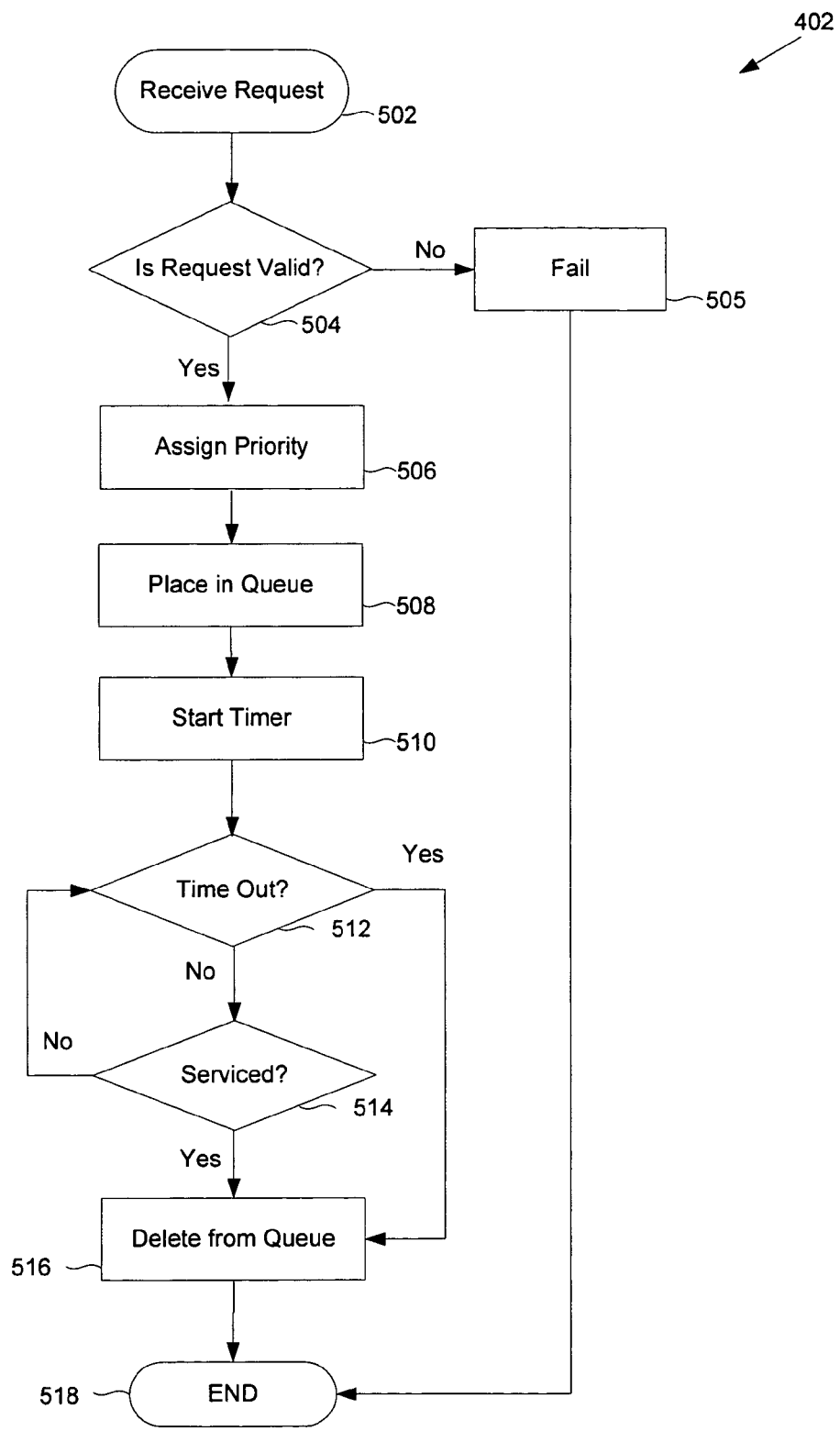
FIG. 5 is a flowchart illustrating a method used in one embodiment to receive and queue requests.

FIG. 5 is a flowchart illustrating a method used in one embodiment to receive and queue requests. In one embodiment, this process is used to perform step 402 of FIG. 4. In this example, a request is received (502). For example, a request requiring access to or information about a device, library, or associated host is received. The request may be received from a remote host, such as a server on which a data mover is running (e.g., server A or server B in the example described above in connection with FIG. 1A). The request may also be generated by a process associated with the MLM itself, such as a configuration process or a process associated with a command or request received from a user (e.g., via a user interface), e.g., a request for an audit of tapes in a library.

It is determined whether the request is valid (504). For example, the request may not be physically possible. A request to access a particular tape that is not in the library, for example, may be determined to be invalid. The request may also be determined to be invalid if the tape is in the library but no drive that is both compatible with the tape and accessible by a host associated with the request is online. In some embodiments, if a requested tape is already in a drive reserved by another application, the request is determined to be invalid. If the request is determined to be invalid, the request fails (505), and the process ends (518). In some embodiments, an error report is generated. If the request is determined to be valid, a priority is assigned to the request (506), as described more fully below. The request is placed in a queue (508). In one embodiment, the request is placed in the queue based on its assigned priority. In one embodiment, the assigned priority is a normalized priority, i.e., differences, if any, between the priority schemes used by the respective sources of the requests are resolved and a priority assigned to each request under a common scheme. A timer is started (510). The timer is associated with the request such that if a preconfigured amount of time has passed and the request has not been serviced, the request times out and the request may be deleted from the queue. As such, it is determined whether the request has timed out (512). If the request has timed out, the request is deleted from the queue (516). In one embodiment, the time out is reported. If the request has not timed out, it is determined whether the request has been serviced (514). If the request has not been serviced, the process returns to step 512. If the request has been serviced, the request is deleted from the queue and the process ends (518). A data mover can continuously generate requests without having to wait until an earlier request is finished being serviced. When a request is finished being serviced, the data mover is notified.

In some alternative embodiments, not illustrated in FIG. 5, if the request is determined to be valid (504), it is determined with respect to at least certain types of request whether the request can be serviced immediately, without placing it in a queue. If the request can be serviced immediately, the request is serviced. For example, if a data mover sends a request to mount a tape in a compatible drive, and the required tape is already in a compatible drive, the drive is reserved for the data mover (if it is not already reserved), and the data mover is notified that the mount is successfully complete. Thus, in such an embodiment a request is not necessarily queued.

Figure 6:
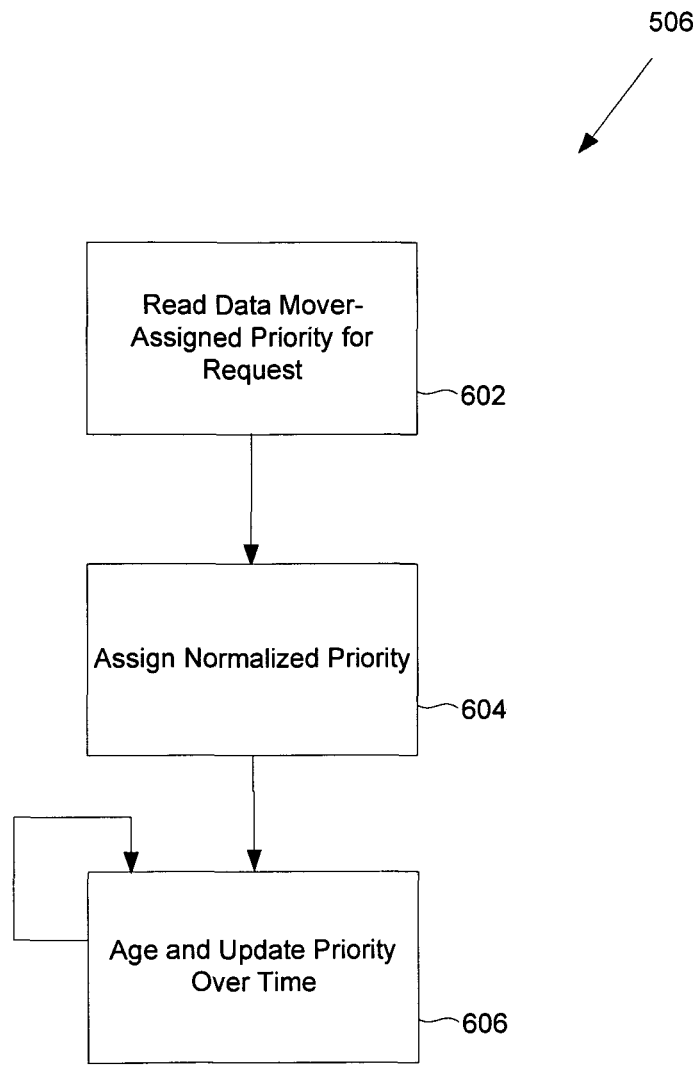
FIG. 6 is a flowchart illustrating a method used in one embodiment to assign a priority.

FIG. 6 is a flowchart illustrating a method used in one embodiment to assign a priority. In one embodiment, this process is used to perform step 506 of FIG. 5. In this example, the data mover-assigned priority for the request is read (602). The data mover-assigned priority is the priority of the request from the data mover's perspective, i.e., relative to the priorities of other requests from the data mover. In some cases, the priority may be assigned under a priority scheme used by the data mover (or other requesting device, application, or process) that is different from the priority scheme used by one or more other data movers or other request sources. For example, referring to the environment shown in FIG. 1A and described above, the data mover running on server A may send a request to the MLM that tape WXY456 be installed in drive 130, e.g., for purposes of backing up data on server X. The same data mover may also send a request to audit tapes in library 116. Because there may be less urgency to know audit results of tapes in library 116, the data mover may assign a higher priority to the request that tape WXY456 be installed on drive 130. A normalized priority is assigned to the request (604). The normalized priority is the priority of the request from the MLM's perspective, i.e., relative to the priorities of other requests received by the MLM and independent of any differences that may exist between the priority assignment schemes used by the different sources from which the MLM may be configured to receive requests. In one embodiment, the normalized priority is a function of the data mover and the data mover-assigned priority. For example, a request from NetWorker™ with a data mover-assigned priority of 3 may have a lower normalized priority than a request from DX2000™ (another type of data mover) with a data mover-assigned priority of 3, as may be the case for example if NetWorker™ used a priority scheme having priorities between 1 and 5 but DX2000™ assigned priorities between 1 and 10. Still other data movers might use other priority schemes, such as "A", "B", and "C" or "high" and "low". In one embodiment, a dismount request has the highest normalized priority, unless there is a very old or very important request (with a higher normalized priority). In some embodiments, the data mover-assigned priority is converted to the normalized priority based on a configuration file maintained by the MLM. The priority is optionally aged and updated over time (606). Aging and updating the priority may help prevent the request from being "starved" at or near the bottom of the queue. For example, the priority associated with a particular request may be configured to increase for every (predetermined) unit of time that elapses. Eventually, if the request is not serviced during this time, the priority of the request reaches a high enough priority that it is serviced. Aging and updating the priority may be a continuous process, as indicated in FIG. 6 by the arrow looping back to step 606.

Figure 7:
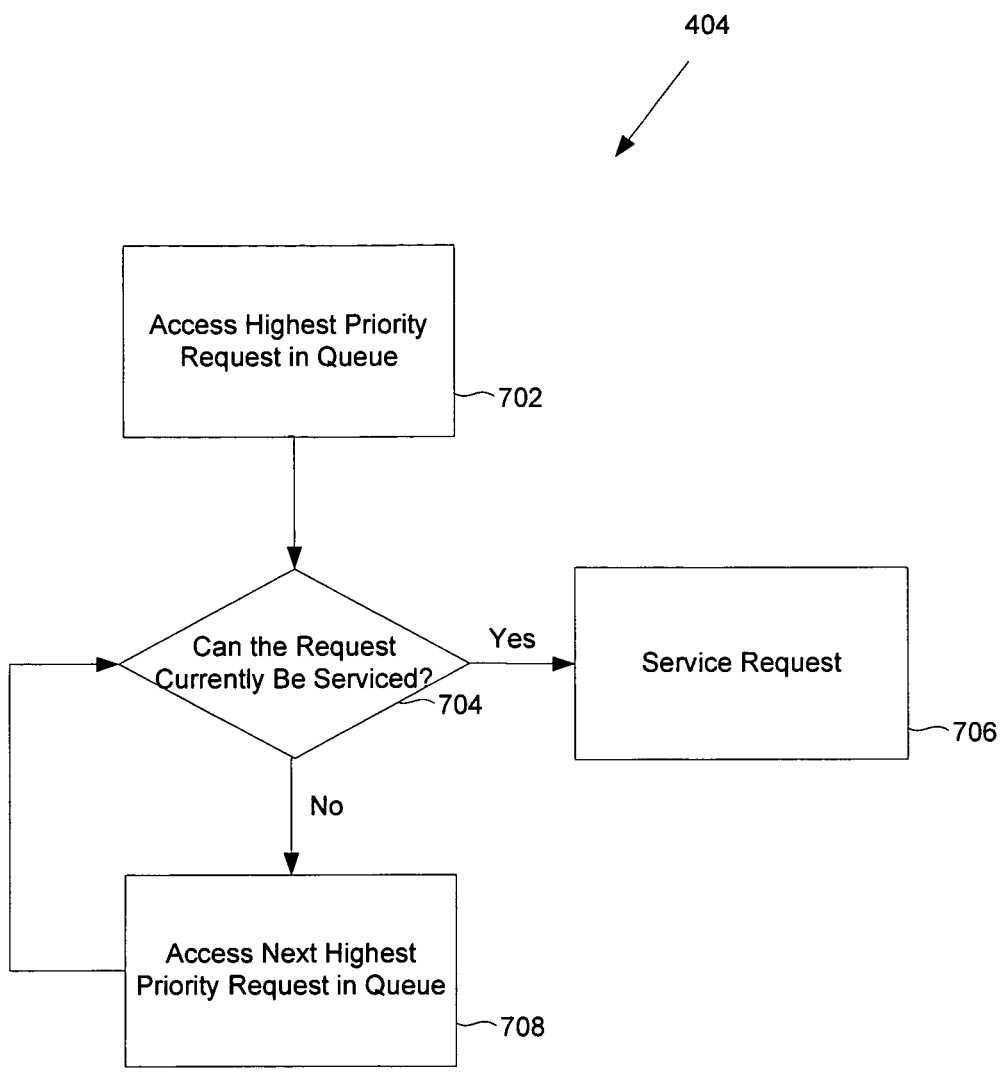
FIG. 7 is a flowchart illustrating a method used in one embodiment to service requests in a queue.

FIG. 7 is a flowchart illustrating a method used in one embodiment to service requests in a queue. In one embodiment, this process is used to perform step 404 of FIG. 4. The highest priority request in the queue is accessed (702). It is determined whether the request currently can be serviced (704), as described more fully below. If the request currently can be serviced, the request is serviced (706), as described more fully below. If the request cannot currently be serviced, the next highest priority request in the queue is accessed (708) and the process returns to step 704. Steps 708 and 704 are repeated until a request that can currently be serviced is identified and serviced.

Figure 8:
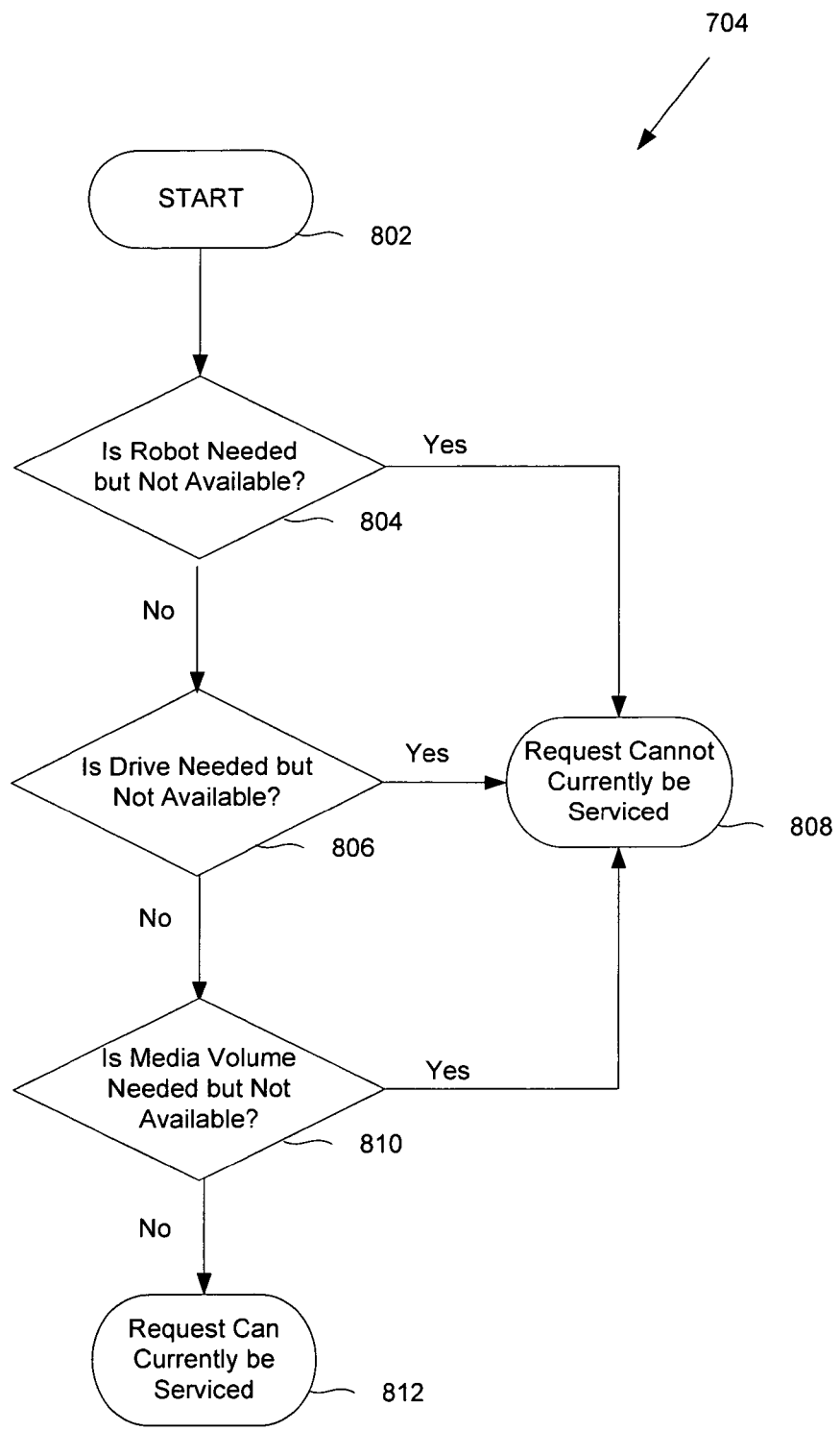
FIG. 8 is a flowchart illustrating a method used in one embodiment to determine whether a request can currently be serviced.

FIG. 8 is a flowchart illustrating a method used in one embodiment to determine whether a request can currently be serviced. In one embodiment, this process is used to perform step 704 of FIG. 7. In this example, it is determined whether a robot would be needed but is not available (804). As used herein a resource is "available" if it is currently operational (i.e., "on line") and not currently being used to service another request. For example, if the request is to mount or dismount a piece of media, a robot may be needed to perform the request. If the robot is currently in use (e.g., mounting or dismounting another piece of media), the robot is not available. If a robot would be needed but is not available, the request cannot currently be serviced (808). If a robot either would not be needed or would be needed and is available, it is determined whether a drive (or storage device) would be needed but is not available (806). For example, if the request is to mount a tape in a particular drive, the drive may be needed to perform the request. If the drive is not empty, the drive may or may not be available. For example, the drive may be in a lazy dismount state, in which the drive has in it a tape from an earlier completed operation that has not yet been dismounted and would not normally be dismounted until a lazy dismount timer has expired. Such a drive may be determined to be available, e.g., if there is a way to preemptively dismount the drive when it is in a lazy dismount state, as described in U.S. patent application Ser. No. 10/882,651, now issued U.S. Pat. No. 7,308,529, which is incorporated by reference above. If a drive would be needed but is not available, the request cannot currently be serviced (808). If a drive would not be needed or would be needed and is available, it is determined whether a media volume (e.g., tape) would be needed but is not available (810). For example, if the request is to mount a particular tape in a library, and the tape is not present in the library, it would be determined in step 810 that a media volume that would be needed to service the request is not available. If a media volume would be needed but is not available, the request cannot currently be serviced (808). If it is determined in step 810 either that no media volume would be needed to service the request or that a media volume needed to service the request is available, it is concluded that the request can currently be serviced (812). In one embodiment, if it is determined that the request cannot currently be serviced (808), the request is queued until the resource becomes available. If the reason that the resource is not available is the required resource (e.g., drive) is offline, then the request fails, and a failure notification is sent to the data mover.

Figure 9:
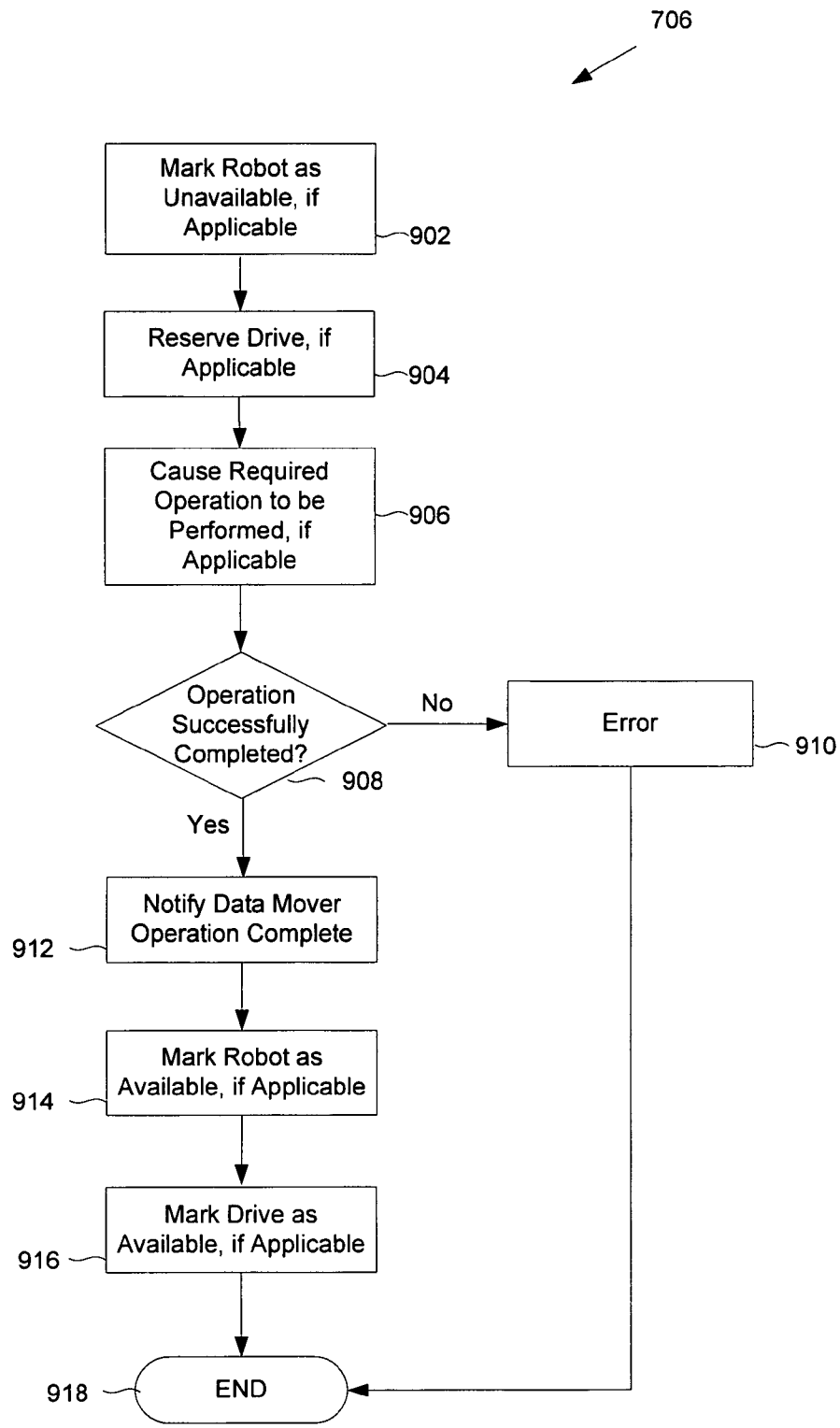
FIG. 9 is a flowchart illustrating a method used in one embodiment to service a request.

FIG. 9 is a flowchart illustrating a method used in one embodiment to service a request. In one embodiment, this process is used to perform step 706 of FIG. 7. If a robot is required to service the request, e.g., a request to mount or dismount a volume of media, the robot is marked as unavailable (902). A drive is reserved, if applicable (904). For example, if the request is to mount a tape to a specified drive, that drive is marked as unavailable. (If the request is to dismount a tape, or to import or export a tape to/from the library, e.g., reserving the drive does not apply.) If the request is to mount a tape to any compatible drive accessible from a given host, any compatible drive may be located and reserved. Such a request may be sent, for example, when a host such as server 108 is to be backed up. Assuming each of drives 130-134 is compatible with the media (e.g., tape) to be used, any one of drives 130-134 may be selected.

The required action is caused to be performed, if applicable (906). Step 906 may comprise commanding a robot to perform the operation, controlling a storage device, or gathering information (e.g., auditing tapes in a library). For example, referring to the environment shown in FIG. 1A and described above, if the backup application running on server A sent a request to the MLM that tape WXY456 be installed in drive 130, e.g., for purposes of backing up data on server X, the media and library manager 138 may send a command (e.g., "mount WXY456 on drive [name of the drive as it is known to the library]") to the library host 118. The LCP installed on host 118 would receive and generate in response to this command a control message in the format suitable for host 118 to control the library 116 as required to cause the designated tape to be installed on the designated drive. If the backup application sends a request to the MLM that tape WXY456 be dismounted from drive 130, e.g., after backing up data on server X, the MLM 138 may send a command (e.g., "eject WXY456 from drive [name of the drive as it is known to the library]") to a DCP installed on server 108 or some other host having access to the drive. The DCP would receive and generate in response to this command a control message to control the drive 130 as required to cause the designated tape to be ejected from the designated drive. The MLM would then send a command (e.g., "move WXY456 from drive [name of the drive as it is known to the library] to the home shelf associated with WXY456") to the library host 118. The LCP installed on host 118 would receive and generate in response to this command a control message to cause the library 116 to move the designated tape from the drive to the home shelf associated with the tape. In some embodiments, when a tape is mounted from a shelf, that originating shelf is recorded by the MLM as the home shelf, so when a dismount occurs, the media can be moved back to the home shelf. It is determined whether the operation is successful (908). In the previous example, the LCP installed on host 118 may be further configured to determine when the operation has been successfully completed and report back to the MLM. In one embodiment, after a mount, the MLM communicates with the DCP to ensure that the media in the drive responds appropriately. If the operation is not successful, an error is reported (910). If the operation is successful, the data mover (or other originator of the request) is notified that the operation is complete (912). The robot, if previously marked as unavailable to service the request, is marked as available (914). The drive is marked as available, if applicable (916). For example, if the request was a request to dismount a particular volume from a drive, the drive is marked as available. (If the request is to mount a tape, marking the drive as available does not apply.) The process ends (918).

For certain types of requests or in other situations, a robot may not be needed. An example of such a request is a command requiring a list of storage devices to which a host has a connection, which requires information from the host but no action by the robot. Another example is a mount request when the tape that needs to be mounted is already in the destination drive.

While the foregoing embodiments focus on media management in the context of backup applications and computer networks, those of ordinary skill in the art will recognize that the same techniques may be used in other contexts and with respect to devices, libraries, and media other than those discussed in detail herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of coordinating media requests from a plurality of sources that share a shared storage media resource, comprising:

providing a generic interface to be used by each of the plurality of sources to send media requests requiring action by the shared storage media resource, wherein the shared storage media resource being one of a number of types of media resource, the generic interface being independent of the type of the shared storage media resource;

receiving, by a media and library manager, via the generic interface from each of one or more of the plurality of sources one or more media requests requiring action by the shared storage media resource, wherein one of the one or more media requests is associated with requiring physical manipulation of a unit of media;

determining whether each of the one or more media requests is valid based at least in part on an availability associated with the respective requested action;

using a processor to assign a normalized priority to each received media request that is determined to be valid based on a source-assigned priority and a source type associated with the source of the request, wherein the source-assigned priority is explicitly assigned by the source of the request based on a source-specific priority assignment scheme that is different from a source-specific priority scheme used by one or more other sources in the plurality of sources and wherein the processor is configured to use a configuration data associated with the source of the request to assign the normalized priority based on the source-assigned priority and the source type associated with the source of the request;

placing, by the media and resource manager, each received media request that is determined to be valid in a queue of requests requiring action by the shared storage media resource; and servicing media requests in the queue based at least in part on their assigned normalized priority, wherein servicing media requests in the queue comprises sending a control message by the media and resource manager to the shared storage media resource via a specific interface associated with media resources of the same type as the shared storage media resource.

2. The method of claim 1, wherein the assigned normalized priority is updated with time.

3. The method of claim 1, wherein the assigned normalized priority is configured to increase with time.

4. The method of claim 1, further including with respect to each received media request deleting the request from the queue after a preconfigured period of time has elapsed since the request was placed in the queue.

5. The method of claim 1, wherein servicing requests in the queue based at least in part on their assigned normalized priority includes servicing the requests in the queue in order from highest priority to lowest priority.

6. The method of claim 1, wherein servicing requests in the queue based at least in part on their assigned normalized priority includes identifying the highest priority request that can currently be serviced.

7. The method of claim 6, wherein identifying the highest priority request that can currently be serviced includes iterating through requests in the queue, beginning with the highest priority request in the queue, and for each request determining whether all of the resources required to service the request are available until a request is identified for which all of the resources required to service the request are currently available.

8. The method of claim 7, wherein determining whether all of the resources required to service the request are available includes determining whether a robot is needed but not available.

9. The method of claim 7, wherein determining whether all of the resources required to service the request are available includes determining whether a storage device is needed but not available.

10. The method of claim 7, wherein determining whether all of the resources required to service the request are available includes determining whether a media volume is needed but not available.

11. The method of claim 1, wherein servicing includes in the case of a request requiring an operation by a robot associated with the shared storage media resource:
marking the robot as unavailable;
performing an operation associated with the robot; and
marking the robot as available once the operation has been performed.

12. The method of claim 1, wherein servicing includes in the case of a request requiring use of a storage device associated with the shared storage media resource:
reserving the storage device;
performing an operation associated with the storage device; and
marking the storage device as available once the operation has been performed.

13. The method of claim 1, wherein one or more of the sources include a data mover.

14. The method of claim 1, wherein assigning a normalized priority includes converting the priority assigned by the source of the request to the normalized priority.

15. The method of claim 14, wherein converting is based on a configuration file.

16. The method of claim 1, wherein the normalized priority is a function of the source of the request and the priority assigned by the source of the request.

17. The method of claim 1, wherein the normalized priority comprises a priority of the request relative to priorities of other requests received and independent of any differences that may exist between priority assignment schemes used by the sources of the requests.

18. The method of claim 1, wherein at least two of the received requests are from sources having different priority assignment schemes.

19. The method of claim 1, wherein at least one of the sources is a data mover.

20. The method of claim 1, wherein the source-assigned priority indicates an analysis, made by the source, of media requests made by the source relative to each other.

21. The method of claim 1, wherein a first media request received from a source has a first source-assigned priority and a second media request received from the same source has a second source-assigned priority that is different from the first source-assigned priority.

22. The method of claim 1, further comprising determining whether a received media request that is determined to be valid can be serviced immediately, in the event that the received media request can be serviced immediately, the received media request is not placed in the queue of requests.

23. A system for coordinating media requests from a plurality of sources that share a shared storage media resource, comprising:
a processor configured to:
provide a generic interface to be used by each of the plurality of sources to send media requests requiring action by the shared storage media resource, wherein the shared storage media resource being one of a number of types of media resource, the generic interface being independent of the type of the shared storage media resource;
receive, by a media and library manager, via the generic interface from each of one or more of the plurality of sources one or more media requests requiring action by the shared storage media resource, wherein one of the one or more media requests is associated with requiring physical manipulation of a unit of media;
determine whether each of the one or more media requests is valid based at least in part on an availability associated with the respective requested action;
assign a normalized priority to each received media request that is determined to be valid based on a source-assigned priority and a source type associated with the source of the request, wherein the source-assigned priority is explicitly assigned by the source of the request based on a source-specific priority assignment scheme that is different from a source-specific priority scheme used by one or more other sources in the plurality of sources and wherein a configuration data associated with the source of the request is used to assign the normalized priority based on the source-assigned priority and the source type associated with the source of the request;

place, by the media and library manager, each received media request that is determined to be valid in a queue of requests requiring action by the shared storage media resource; and service media requests in the queue based at least in part on their assigned normalized priority, wherein servicing media requests in the queue comprises sending a control message by the media and library manager to the shared storage media resource via a specific interface associated with media resources of the same type as the shared storage media resource; and a memory that is coupled with the processor, wherein the memory provides the processor with instructions.

24. The system of claim 23, wherein the processor is further configured to determine whether a received media request that is determined to be valid can be serviced immediately, in the event that the received media request can be serviced immediately, the received media request is not placed in the queue of requests.

25. A computer program product for coordinating media requests from a plurality of sources that share a shared storage media resource, the computer program product being embodied in a non-transitory computer readable medium and comprising computer instructions for:

providing a generic interface to be used by each of the plurality of sources to send media requests requiring action by the shared storage media resource, wherein the shared storage media resource being one of a number of types of media resource, the generic interface being independent of the type of the shared storage media resource;

receiving, by a media and library manager, via the generic interface from each of one or more of the plurality of sources one or more media requests requiring action by the shared storage media resource, wherein one of the one or more media requests is associated with requiring physical manipulation of a unit of media;

determining whether each of the one or more media requests is valid based at least in part on an availability associated with the respective requested action;

assigning a normalized priority to each received media request that is determined to be valid based on a source-assigned priority and a source type associated with the source of the request, wherein the source-assigned priority is explicitly assigned by the source of the request based on a source-specific priority assignment scheme that is different from a source-specific priority scheme used by one or more other sources in the plurality of sources and wherein a configuration data associated with the source of the request is used to assign the normalized priority based on the source-assigned priority and the source type associated with the source of the request;

placing, by the media and library manager, each received media request that is determined to be valid in a queue of requests requiring action by the shared storage media resource; and servicing media requests in the queue based at least in part on their assigned normalized priority, wherein servicing media requests in the queue comprises sending a control message by the media and library manager to the shared storage media resource via a specific interface associated with media resources of the same type as the shared storage media resource.

26. The computer program product of claim 25, further comprising determining whether a received media request that is determined to be valid can be serviced immediately, in the event that the received media request can be serviced immediately, the received media request is not placed in the queue of requests.

* * * * *